United States Patent
Glauser et al.

(10) Patent No.: US 11,579,156 B2
(45) Date of Patent: Feb. 14, 2023

(54) METHOD AND LABORATORY SYSTEM TO PROVIDE CONTROL SAMPLES FOR VALIDATING A DIAGNOSTIC TEST

(71) Applicant: Roche Diagnostics Operations, Inc., Indianapolis, IN (US)

(72) Inventors: Michael Glauser, Muri bei Bern (CH); Urs Vollenweider, Waedenswil (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 421 days.

(21) Appl. No.: 16/897,591

(22) Filed: Jun. 10, 2020

(65) Prior Publication Data

US 2020/0393476 A1 Dec. 17, 2020

(30) Foreign Application Priority Data

Jun. 14, 2019 (EP) .................................. 19180180

(51) Int. Cl.
*G01N 35/00* (2006.01)
*G01N 35/04* (2006.01)

(52) U.S. Cl.
CPC ....... *G01N 35/00712* (2013.01); *G01N 35/04* (2013.01); *G01N 2035/0401* (2013.01)

(58) Field of Classification Search
CPC ............. G01N 35/00712; G01N 35/04; G01N 2035/0401; G01N 35/0092; G01N 2035/0094; G01N 2035/1032; G01N 35/00613; G01N 2001/2893; G01N 35/00584; G01N 35/00623; G01N 35/00663; G01N 35/00693; G01N 35/02; G01N 2035/00653
See application file for complete search history.

(56) References Cited

U.S. PATENT DOCUMENTS

| 6,984,527 B2 | 1/2006 | Miller |
| 2002/0015665 A1* | 2/2002 | Lindsey ................. G01N 35/04 422/509 |
| 2015/0031143 A1* | 1/2015 | Suzuki ............... G01N 35/1016 436/180 |

FOREIGN PATENT DOCUMENTS

| JP | 3456162 B2 | 10/2003 |
| JP | 5372723 B2 | 9/2013 |
| JP | 5157952 B2 | 6/2017 |
| WO | 2005/111628 A2 | 11/2005 |
| WO | 2018/017768 A1 | 1/2018 |

* cited by examiner

*Primary Examiner* — Jill A Warden
*Assistant Examiner* — John McGuirk
(74) *Attorney, Agent, or Firm* — Roche Diagnostics Operations, Inc.

(57) ABSTRACT

A method to provide control samples for validating a diagnostic test within a laboratory system is presented. The laboratory system comprises an aliquoting device, a storage, a transport system, at least two analyzers, and a control unit. A total number of control sample aliquots and an aliquot volume for each control sample aliquot is determined based on a validation time schedule. A provided total control sample volume is aliquoted into the determined total number of control sample aliquots with the determined aliquot volumes. The generated control sample aliquots are transported to one or more of the at least two analyzers according to the validation time schedule.

9 Claims, 7 Drawing Sheets

FIG. 4A

| | | Validation time schedule 58 | | | | | |
|---|---|---|---|---|---|---|---|
| 63 – Defined time period | | | | | | | |
| Day | | Day 1 | | | | Day 2 | |
| 66 – Validation time points | 00:00 | 04:00 | 12:00 | 16:00 | | 00:00 | 04:00 |
| 68 – Onboard stability time | | 16 h | | | | 16 h | |
| 64 – Time segment | | 1 | | | | 2 | |
| 50 – Analyzer A | CSA 1 | | | CSA 3 | | | |
| 52 – Analyzer B | CSA 2 | | | CSA 4 | | | |
| 82 – Analyzer C | | CSA 1 | | | | CSA 3 | |
| 84 – Analyzer D | | | CSA 2 | | | CSA 4 | |
| 86 – Analyzer E | | | | CSA 5 | | | |
| Storage | | CSA 2 | CSA 2 | | | | |
| 46 | CSA 3 | CSA 3 | CSA 3 | CSA 3 | | CSA 3 | |
| | CSA 4 | CSA 4 | CSA 4 | CSA 4 | | CSA 4 | |
| | CSA 5 | CSA 5 | CSA 5 | CSA 5 | | | |

FIG. 4B

| 42 – Control sample aliquot | CSA 1 | CSA 1 | | | CSA 3 | CSA 3 | CSA 3 |
|---|---|---|---|---|---|---|---|
| 56 – Aliquot volume | CS | | | | CS | | |
| | CS | CS | | | CS | CS | CS |
| | DV | DV | | | DV | DV | DV |

| 42 – Control sample aliquot | CSA 2 | CSA 2 | CSA 2 | CSA 2 | CSA 4 | CSA 4 | CSA 4 |
|---|---|---|---|---|---|---|---|
| 56 – Aliquot volume | CS | | | | CS | | |
| | CS | CS | CS | CS | CS | CS | CS |
| | DV | DV | DV | DV | DV | DV | DV |

| 42 – Control sample aliquot | | | | | CSA 5 | | |
|---|---|---|---|---|---|---|---|
| 56 – Aliquot volume | | | | | CS | | |
| | | | | | DV | | |

FIG. 5

| | | Validation time schedule | | | | | | | | | | | |
|---|---|---|---|---|---|---|---|---|---|---|---|---|---|
| | | 3 days | | | | | | | | | | | |
| 63 { | Defined time period | | | | | | | | | | | | |
| | Day | Day 1 | | | | Day 2 | | | | Day 3 | | | |
| 66 | Validation time points | 00:00 | 04:00 | 08:00 | 12:00 | 16:00 | 00:00 | 04:00 | 08:00 | 12:00 | 16:00 | 00:00 | 04:00 | 08:00 | 12:00 | 16:00 |
| 68 | Onboard stability time | 2 days | | | | | | | | | 2 days | | | |
| 65 | Validation cycle | 1 | | | | | 2 | | | | 3 | | | |
| 50 | Analyzer A | CSA 1 | | | | | | | | | | | | |
| 52 | Analyzer B | | CSA 1 | | | | | | | | | | | |
| 82 | Analyzer C | | | CSA 1 | | | | | | | | | | |
| 84 | Analyzer D | | | | CSA 1 | | | | | CSA 1 | | | | |
| 86 | Analyzer E | | | | | CSA 1 | | | | | | | CSA 2 | |
| 46 | Storage | CSA 2 | CSA 2 | CSA 2 | CSA 2 | CSA 2 | CSA 2 | CSA 2 | CSA 2 | CSA 2 | CSA 2 | CSA 2 | | |

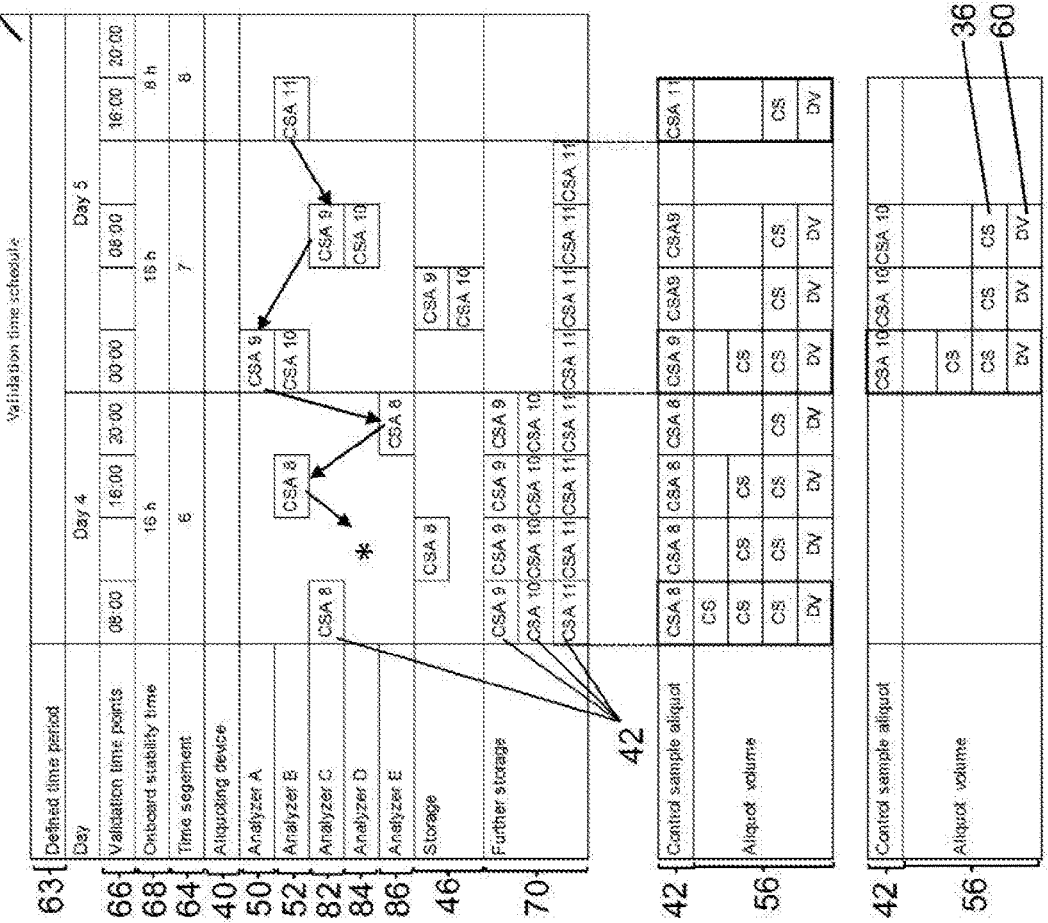

METHOD AND LABORATORY SYSTEM TO PROVIDE CONTROL SAMPLES FOR VALIDATING A DIAGNOSTIC TEST

CROSS-REFERENCE TO RELATED APPLICATIONS

This application claims priority to EP 19180180.2, filed Jun. 14, 2019, which is hereby incorporated by reference.

BACKGROUND

The present disclosure generally relates to the field of automated in vitro diagnostic laboratory testing and, in particular, to a method and a laboratory system providing control samples for validating a diagnostic test within the laboratory system.

In automated diagnostic laboratory environments, a high number of test samples are analyzed using diagnostic tests in a cautious and efficient manner in order to produce accurate and reliable test results, which represent pivotal information for physicians. Inaccurate diagnostic tests may lead to incorrect test results, or in the worst case to false negative or false positive test results, causing misinterpretation of test results, inappropriate further testing, and initiation of treatments with potentially hazardous outcomes for the patient. Typically, automated diagnostic laboratory environments comprise laboratory systems with multiple analyzers for executing the same diagnostic test on test samples according to predefined laboratory workflows in order to improve throughputs and/or turn-around times.

During a diagnostic test, an analyte-related signal or parameter is measured on an analyzer and then processed to a test result indicating the presence and/or the concentration of the analyte of interest in a test sample. The quality, reliability, and comparability of test results depend on the status of used test reagents and/or analyzer operation status during diagnostic testing. It is therefore required to validate diagnostic tests on a regular basis during operation of an analyzer according to a validation time schedule for monitoring the performance and validity of a diagnostic test. For validating a diagnostic test, a control sample with a known analyte and known or determined analyte concentration is measured on the analyzer and the resulting validation result is compared to predefined permitted result ranges. Only if validation results are within the predefined permitted result ranges can the test results of diagnostic tests be released for further diagnosis. If validation results are out of range, corresponding measures have to be initiated in order to bring the analyzer back to the required specifications. The management and preparation of control samples for a laboratory system comprising multiple analyzers is very time consuming for an operator. Many manual steps are performed to execute a validation time schedule, which may introduce unnecessary errors potentially causing incorrect test results, test result delays or operation downtime.

With improved throughputs and turn-around times of laboratory systems, the number of control samples, which have to be provided for validation and the demand of the corresponding storage space is increasing. However, control samples as well as storage space are expensive and therefore have to be used efficiently. Furthermore, the availability and the time to transport control samples to analysers for validating a diagnostic test should not be the limiting factor in a laboratory workflow so that test results can be provided on time and with required quality for further diagnosis. Additionally, validation results generated by different analyzers executing the same diagnostic test have to be comparable to each other for reliable and consistent monitoring of the validity of a diagnostic test within a laboratory system.

Therefore, there is a need to provide control samples for validating a diagnostic test within a laboratory system in a simple, reliable and cost-efficient way, thereby better serving the needs of automated in vitro diagnostic laboratory testing.

SUMMARY

According to the present disclosure, a method to provide control samples for validating a diagnostic test within a laboratory system is presented. The laboratory system can comprise an aliquoting device configured to generate control sample aliquots from a total control sample volume, a storage configured to store control sample aliquots, a transport system configured to transport control sample aliquots, at least two analyzers configured to execute the diagnostic test and to validate the diagnostic test by measuring one control sample, and a control unit. The aliquoting device, the storage, and the at least two analyzers can be operatively connected to the transport system. The aliquoting device, the storage, the transport system, and the at least two analyzers can be communicatively connected to the control unit. The method can comprise determining, by the control unit, a total number of control sample aliquots and an aliquot volume for each control sample aliquot based on a validation time schedule. Each aliquot volume can comprise a dead volume and a volume comprising a determined number of control samples, each with a volume required for validating the diagnostic test once. The method can also comprise providing one or more vessels containing the total control sample volume to the aliquoting device. The total control sample volume can be at least the sum of aliquot volumes of the total number of control sample aliquots. The method can also comprise generating, by the aliquoting device, the determined total number of control sample aliquots with the determined aliquot volumes and controlling, by the control unit, the transport system to transport at least one control sample aliquot to the storage or to one of the at least two analyzers for validating the diagnostic test by measuring one control sample of the at least one control sample aliquot according to the validation time schedule.

Accordingly, it is a feature of the embodiments of the present disclosure to provide control samples for validating a diagnostic test within a laboratory system in a simple, reliable and cost-efficient way, thereby better serving the needs of automated in vitro diagnostic laboratory testing. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 4A-B illustrate another example of a validation time schedule, control sample aliquots, and course of aliquot volumes during each time segment of the validation schedule according to an embodiment of the present disclosure.

FIG. 5 illustrates another example of a validation time schedule according to an embodiment of the present disclosure.

FIGS. 6A-B illustrate other examples of validation time schedules according to an embodiment of the present disclosure.

DETAILED DESCRIPTION

Figure 1:
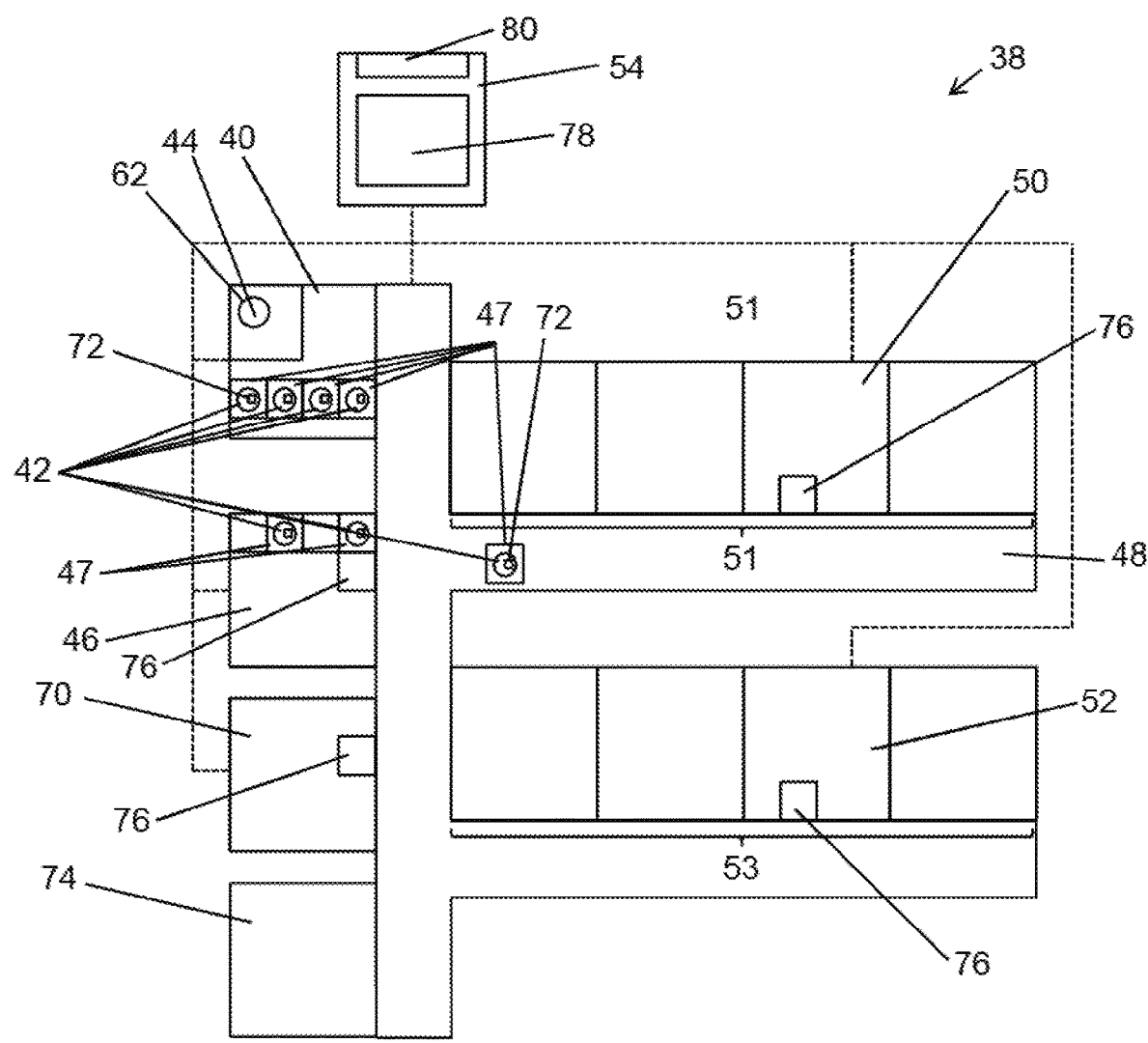
FIG. 1 illustrates a schematic representation of a laboratory system to provide control samples for validating a diagnostic test within the laboratory system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The present disclosure relates to a method to provide control samples for validating a diagnostic test within a laboratory system. The laboratory system can comprise an aliquoting device configured to generate control sample aliquots from a total control sample volume, a storage configured to store control sample aliquots, a transport system configured to transport control sample aliquots, at least two analyzers configured to execute the diagnostic test and to validate the diagnostic test by measuring one control sample, and a control unit. The aliquoting device, the storage, and the at least two analyzers can be operatively connected to the transport system. The aliquoting device, the storage, the transport system, and the at least two analyzers can be communicatively connected to the control unit.

The method can comprise the following steps:

a) determining, by the control unit, a total number of control sample aliquots and an aliquot volume for each control sample aliquot based on a validation time schedule, wherein each aliquot volume can comprise a dead volume and a volume comprising a determined number of control samples each with a volume required for validating the diagnostic test once;

b) providing one or more vessels containing the total control sample volume to the aliquoting device, wherein the total control sample volume can be at least the sum of aliquot volumes of the total number of control sample aliquots;

c) generating, by the aliquoting device, the determined total number of control sample aliquots with the determined aliquot volumes; and d) controlling, by the control unit, the transport system to transport at least one control sample aliquot to the storage or to one of the at least two analyzers for validating the diagnostic test by measuring one control sample of the at least one control sample aliquot according to the validation time schedule.

As used herein, the term "control sample" can relate to a sample of known volume, known analyte, and known or determined analyte concentration. Thus, a control sample may be either an assayed control sample, which has been analyzed by the manufacturer so that the analyte concentration is known or an unassayed control sample for which the laboratory purchasing the control sample has to determine the analyte concentration. A control sample can comprise a volume, which can be required for validating a diagnostic test once. The analyte of a control sample can correspond to the analyte of interest when a test sample is analyzed by executing an analyte specific diagnostic test on an analyzer. The control sample can be measured by an analyzer in the same manner as a test sample in order to monitor that a diagnostic test executed by the analyzer is valid and produces accurate and reliable test results. A control sample may comprise one or more different analytes of known or determined concentration and can be used for validating one or more different diagnostic tests.

As used herein, the term "validating a diagnostic test" can relate to a process for monitoring the validity of a diagnostic test. During validation of a diagnostic test, a control sample comprising an analyte, which corresponds to an analyte of interest of a diagnostic test can be measured by an analyzer configured to execute the diagnostic test when analyzing a test sample, the measured analyte-related signal can be processed to a validation result, and the validation result can be compared to predefined permitted result range. Only if the validation result is within the predefined permitted result range, the diagnostic test executed on the analyzer is valid and can produce accurate and reliable test results, which can be released for further diagnosis.

As used herein, the term "diagnostic test" can relate to an analysis or investigation of a test sample in order to determine the presence and, if desired, the concentration of an analyte of interest. Thus, a diagnostic test can define which analyte or parameter has to be analyzed in the test sample. Based on the determined presence and/or concertation of the analyte, a qualitative or quantitative test result can be generated which can help to made a diagnosis, to plan a treatment or therapy, to see if a treatment or therapy is working, or to monitor a disease over time. A diagnostic test may be based on a specific analytical method using a specific technique or technology for the qualitative and/or quantitative detection or measurement of a signal or physical parameter associated with an analyte. The analytical method can define how and with which means an analyte can be detected in a test sample or control sample. The analytical method may comprise only a detection method if a signal or physical parameter associated with an analyte can be directly detectable. Alternatively, the analytical method may comprise a preceding test reaction for developing a detectable signal associated with an analyte and a detection method for detecting the developed signal. The detected or measured signal or physical parameter associated with an analyte can then be processed to a test result of the diagnostic test indicating the presence and/or the concentration of an analyte of interest in the test sample.

As used herein, the term "test sample" can relate to a patient's specimen (e.g., serum, plasma, whole blood, urine, stool, sputum, cerebrospinal fluid, bone marrow, and the like) from which the presence and, if desired, the concentration of an analyte or parameter can be determined using a diagnostic test. As a test sample is taken from an individual patient at a certain time, corresponding test sample attributes can be unique for each test sample.

As used herein, the term "aliquoting device" can relate to a device comprising a pipetting device configured to divide a total control sample volume into control sample aliquots of determined aliquot volumes. The aliquoting device may divide the total control sample volume into control sample aliquots of equal or unequal aliquot volumes. The aliquoting device may comprise one or more holding positions configured to hold one or more vessels comprising a total control sample volume and one or more holding positions configured to hold one or more control sample aliquot tubes. The pipetting device can transfer then control sample aliquots of determined aliquot volumes from the total control sample volume of the one or more vessels into one more control sample aliquot tubes.

As used herein, the term "control sample aliquot" can relate to a fraction of the total control sample volume with a determined volume (aliquot volume) contained in a tube (control sample aliquot tube). Each determined aliquot volume of each control sample aliquot can comprise a dead volume and a volume comprising a determined number of control samples, each with a volume required for validating a diagnostic test once. Thus, the volume of one control sample can be required for producing one validation result. For each validation of a diagnostic test, a control sample aliquot can be transported to the one or more of the at least two analyzers where one control sample of the control sample aliquot can be aspirated by the one or more of the at least two analyzers for subsequent measuring of the one control sample by one or more of the at least two analyzers. The term "dead volume" as used herein can relate to a residual volume of control sample in the control sample aliquot tube after the determined number of control samples have been aspirated by the one or more analyzers of the at least two analyzers. Thus, the dead volume can be unusable for producing a validation result or validating a diagnostic test. The dead volume can assure that the determined number of control samples can be aspirated by the one or more analyzers of the at least two analyzers without the inherent danger of partial air aspiration or damage of a control sample aliquot tube or pipetting device of an analyzer by a physical contact between the control sample aliquot tube and the pipetting device.

In one embodiment, the control samples in the one or more vessels can be liquid control samples. Thus, the pipetting device of the aliquoting device can directly transfer control sample aliquots of determined aliquot volumes from the total control sample volume of the one or more vessels into one more control sample aliquot tubes without further preliminary processing of the total control sample volume.

In another embodiment, the control samples in the one or more vessels can be lyophilized control samples. In this case, the one or more vessels containing the total control sample volume can comprise one or more vessels containing the lyophilized control samples and one or more vessels containing a liquid in which the control samples can be reconstituted. The aliquoting device can be further configured to reconstitute the lyophilized control samples and step b) of the method can further comprise reconstituting, by the aliquoting device, the lyophilized control samples in the one or more vessels to the total control sample volume.

In an alternative embodiment, the laboratory system can further comprise a reconstitution device configured to reconstitute the lyophilized control samples and step b) of the method can further comprise reconstituting, by the reconstitution device, the lyophilized control samples in the one or more vessels to the total control sample volume before providing the one or more vessels containing the total control sample volume to the aliquoting device.

Control samples can be reconstituted by transferring the liquid from the one or more vessels containing the liquid in which the control samples can be reconstituted into the one more vessels containing the lyophilized control samples using a pipetting device of the aliquoting device or reconstitution device. In a specific embodiment, the one or more vessels containing the liquid in which the control samples can be reconstituted may be comprised by a device connected to a pure water supply device. The reconstitution of the control samples may further comprise the mixing, shaking and/or the heating of the one or more vessels containing a mixture of the lyophilized control samples and the liquid using a mixing device, shaking device and/or a heating device of the aliquoting device or reconstitution device.

As used herein, the term "storage" can relate to a cabinet of various sizes, which can be able to store a plurality of control sample aliquots in storage racks, or carrier systems, which can be transported into and out of the storage through a gate. As used herein, the term "carrier system" can relate to a device adapted for receiving, holding, transporting, and/or releasing a control sample aliquot. In one embodiment, the storage can comprise a control sample aliquot handler configured to position or insert a control sample aliquot into a storage rack or carrier system, e.g., for transferring control sample aliquots between storage racks and carrier systems. In one embodiment, the storage may have a tempering unit to hold the ambient temperature for the control sample aliquots in the storage within a defined temperature range (e.g., 22° C. ±1° C.) or below room temperature, possibly below about 18° C. or possibly below about 10° C., or possibly below about 0° C. In a specific embodiment, the storage may have a tempering unit to hold the ambient temperature for the control sample aliquots in the storage between about 4° C. and room temperature. In a further embodiment, the storage may comprise a hygrometer and an air humidifier in order to reduce the evaporation of uncapped control sample aliquots. In its inside, the storage may comprise a plurality of shelves for the storage of a number of storage racks or carrier systems in predefined storage positions. The storage may further have, in addition, or alternatively, to shelves, compartmented trays or inserts for the storage racks or carrier systems. Further, shelves or compartments with different heights may be provided in order to be able to optimize available space when storing control sample aliquots of different heights. In a specific embodiment, the storage can be a refrigerator operatively connected to the transport system or a storage unit of one or more of the at least two analyzers. In a further specific embodiment, the storage can be a freezer operatively connected to the transport system. Alternatively, the storage may be a dedicated covered area of the transport system defining or forming a cabinet to store a plurality of control sample aliquots in carrier systems.

As used herein, the term "transport system" can relate to a system being designed to transport or distribute vessels containing a total control sample volume, control sample aliquot tubes, test sample tubes, test reagent containers, or test consumable containers to connected pre-analytical stations, analyzers or post-analytical stations. The transport system may comprise a transport plane on which carrier systems loaded with vessels containing a total control sample volume, control sample aliquot tubes, test sample tubes, test reagent containers, or test consumable containers can be transported. The transport system may comprise a conveyor belt to move the carrier systems. Alternatively, the transport system may comprise a number of electro-magnetic actuators being stationary arranged below the transport plane and adapted to generate magnetic fields to move the carrier systems. Alternatively, the transport system may comprise a stable transport plane on which self-propelled carrier systems can move. Alternatively, the transport system may comprise one or more rails on which carrier systems can be transported.

A pre-analytical station can usually be used for the preliminary processing of control samples or test samples. In one embodiment, the pre-analytical station can be an aliquoting device. In another embodiment, the pre-analytical station can be a reconstitution device.

As used herein, the term "analyzer" can relate to a device configured to execute a diagnostic test for analyzing a test sample or part of the test sample in order to produce a measurable analyte related signal, on the basis of which it can be possible to produce a test result indicating whether the analyte or parameter is present, and, if desired, in what concentration. Furthermore, an analyzer can be configured to execute the diagnostic test on a control sample in order to produce a measurable analyte related signal, on the basis of which it can be possible to produce a validation result indicating whether the diagnostic test executed on the analyzer produces valid and reliable test results which can be released for further diagnosis.

In one embodiment, each of the at least two analyzers can be an analyzer module of a modular analyzer system of at least two separate modular analyzer systems. The at least two separate modular analyzer systems can be operatively connected to the transport system and communicatively connected to the control unit. In one embodiment, multiple analyzer modules configured to execute different diagnostic tests may be combined in one modular analyzer system so that diagnostic test of different analytical methods can be performed on the same modular analyzer system. For example, a modular analyzer system may comprise two are more analyzer modules selected from a group comprising an immunochemistry analyzer, clinical chemistry analyzer, nucleic acid analyzer, coagulation analyzer, haematology analyzer, urine analyzer, a blood gas analyser, or a combination thereof for conducting different analytical methods in order to provide a laboratory test portfolio for testing different analytes or parameters for a comprehensive diagnostic. In another example, multiple analyzer modules configured to execute the same diagnostic test may be combined in one modular analyzer system so that the throughputs and turn-around times of the diagnostic test may be improved. Furthermore, such a modular system may be more failure safe due to the redundancy of analyzer modules configured to execute the same diagnostic test.

A post-analytical station can usually be used for the post-processing of control samples or test samples like the storage or disposal of control samples or test samples. In one embodiment, the post-analytical station can be a storage. In another embodiment, the post-analytical station can be an additional storage. In a further embodiment, the post-analytical station can be a disposal unit.

The pre-analytical station, analyzer and post-analytical station may further comprise, for example, at least one device from the group of following devices: a sorting device for sorting test sample tubes or control sample aliquot tubes, a cap removal device for removing caps or closures on test sample tubes or control sample aliquot tubes, a cap fitting device for fitting caps or closures on test sample tubes or control sample aliquot tubes, a cap removal/fitting device for removing/fitting caps or closures on test sample tubes or control sample aliquot tubes, a pipetting device for pipetting test samples or control samples, an aliquoting device for aliquoting test samples or control samples, a centrifuging device for centrifuging test samples or control samples, an analyzing device for analyzing test samples or control samples, a heating device for heating test samples or control samples, a cooling device for cooling test samples or control samples, a mixing device for mixing test samples or control samples, a separation device for isolating an analyte of test samples or control samples, a storing device for storing test samples or control samples, an archiving device for archiving test samples or control samples, a test sample vessel type or control sample aliquot tube type determination device for determining a test sample vessel type or control sample aliquot tube type, a sample quality determination device for determining a test sample quality or control sample quality, a tube identification device for identifying a test sample tube or control sample aliquot tube, a liquid level detection device for detecting a liquid level in a test sample tube or control sample aliquot tube. Such pre-analytical stations, analyzers, post-analytical stations, and devices are well known in the art.

The term "control unit" as used herein can encompass any physical or virtual processing device comprising a processor, which can be configured to control the laboratory system in a way that control samples can be provided for validating a diagnostic test within a laboratory system. The control unit may receive information from a management unit regarding control samples which have to be transported to one or more of the at least two analyzers of the laboratory system according to a validation time schedule. The processor of the control unit may control at least the aliquoting device, reconstitution device, storage, additional storage, the transport system, and the at least two analyzers which can be communicatively connected to the control unit. The processor of the control unit may, for instance, be embodied as a programmable logic controller adapted to execute a computer-readable program stored on a computer-readable storage medium provided with instructions to cause the laboratory system as described herein to execute the steps of the method to provide control samples for validating a diagnostic test within a laboratory system as described below. The control unit may further comprise a user interface for entering information or orders regarding test samples or control samples, which have to be processed on the laboratory instrument. Furthermore, an operator may use the user interface for displaying and/or configuring a validation time schedule or information about the one or more vessels containing the total control sample volume to be provided for validating a diagnostic test within the laboratory system according to the validation time schedule.

As used herein, the term "validation time schedule" can relate to a plan at which time points a certain diagnostic test has to be validated on a certain analyzer of the at least two analyzers to monitor if the certain analyzer still produces valid and reliable test results. Accordingly, the validation time schedule can define at which time points, which control sample aliquot can be scheduled to be transported to which analyzer. In one embodiment, the validation time schedule can comprise a defined time period and at least one time segment. The validation time schedule can define for each of the at least two analyzers and for each of the at least one time segment a number of validation time points at which a control sample aliquot can be scheduled to be transported to one or more of the at least two analyzers for validating the diagnostic test by measuring one control sample of the control sample aliquot. In one embodiment, the validation time schedule can comprise more than one time segment and the time segments may have the same or different length.

In a specific embodiment, the time segment can be a control sample aliquot onboard stability time or a fraction of the control sample onboard stability time. The number of time segments and length of each time segment of a validation time schedule may be determined based on the defined time period of the validation time schedule and the control sample onboard stability time. The term "control sample aliquot onboard stability time" as used herein can relate to a time duration over which a control sample of a control sample aliquot remains viable for validating the diagnostic test if the control sample aliquot is kept at one or more defined conditions or undergoes a number of permitted control sample aliquot processing steps. If this time duration has elapsed, the control sample aliquot containing the control sample may not be transported anymore to one or more of the at least two analyzers for validating the diagnostic test by measuring the control sample.

In one embodiment, the control sample aliquot onboard stability time can be a maximal time duration at which the control sample aliquot can be kept at one or more defined conditions or a time duration during which a number of permitted control sample aliquot processing steps can be conducted. The control sample aliquot onboard stability time may be a predefined maximal time duration. Alternatively, the control sample aliquot onboard stability time may depend on the validation time points because the time duration at which a certain control sample aliquot is kept at one or more defined conditions or the time duration during which a number of permitted control sample aliquot processing steps are conducted may depend on the scheduled validation time points.

In a specific embodiment, the defined condition can be a defined temperature or opened status of the control sample aliquot. For example:

If the control sample aliquot onboard stability time has a maximal time duration of two days at which the control sample aliquot can be kept at room temperature and the two days at room temperature have elapsed, then the control sample aliquot containing a control sample may not be transported anymore to one or more of the at least two analyzers for validating the diagnostic test by measuring the control sample.

If the control sample aliquot onboard stability time has a maximal time duration of 30 minutes at which the control sample aliquot can be kept at room temperature and 23.5 hours at which the control sample aliquot can be kept at 4° C. and the 30 minutes at room temperature or 23.5 hours at 4° C. have elapsed, then the control sample aliquot containing a control sample may not be transported anymore to one or more of the at least two analyzers for validating the diagnostic test by measuring the control sample.

If the control sample aliquot onboard stability time has a maximal time duration of one hour at which the control sample can be kept in an open status and the one hour has elapsed, then the control sample aliquot containing a control sample may not be transported anymore to one or more of the at least two analyzers for validating the diagnostic test by measuring the control sample.

In a further specific embodiment, the number of permitted control sample aliquot processing steps has a maximal number of temperature changes that the aliquot can undergo or a maximal number of transports to the one or more of the at least two analyzers where at least one control sample of the control sample aliquot is aspirated by the one or more of the at least two analyzers for subsequent measuring of the at least one control sample. For example:

If the control sample aliquot onboard stability time has a time duration during which the control sample aliquot can undergo maximal five temperature changes (e.g., from about 4° C. to room temperature, from room temperature to about 4° C., from about 4° C. to room temperature, from room temperature to about 4° C., from about 4° C. to room temperature) and the control sample has undergone the five temperature changes, then the control sample aliquot containing a control sample may not be transported anymore to one or more of the at least two analyzers for validating the diagnostic test by measuring the control sample.

If the control sample aliquot onboard stability time has a time duration during which the control sample aliquot can be transported five times to one or more of the at least two analyzers where one control sample of the control sample aliquot is aspirated by the one or more of the at least two analyzers each time and five control samples have been aspirated from the control sample aliquot, then the control sample aliquot containing a control sample may not be transported anymore to one or more of the at least two analyzers for validating the diagnostic test by measuring the control sample.

In one embodiment, the validation time points for each of the at least two analyzers can be determined by predefined time intervals, predefined times, predefined days, predefined number of executed diagnostic tests, and/or predefined events. For example:

Every 12 hours or 24 hours, a control sample aliquot can be scheduled to be transported to one of the at least two analyzers for validating the diagnostic test by measuring one control sample of the control sample aliquot.

Every Monday and Thursday at 4:00 pm, a control sample aliquot can be scheduled to be transported to one of the at least two analyzers for validating the diagnostic test by measuring one control sample of the control sample aliquot.

After executing 30 diagnostic tests on test samples, a control sample aliquot can be scheduled to be transported to one of the at least two analyzers for validating the diagnostic test by measuring one control sample of the control sample aliquot. As the exact time duration during which a number of diagnostic tests have been executed on test samples varies and depends on incoming test orders and/or workload of the laboratory system, validation time pointes can be defined by forecasts based on past operation information. For example, next Monday between 8:00 am and 11:00 am, the execution of thirty diagnostic tests can be expected during the last five months, every Monday between 8:00 am and 11:00 am 30 diagnostic tests have been executed.

In one embodiment, the predefined events can be maintenance activities and/or calibration measurements. For example:

Every day at 8:00 am, a certain maintenance activity can be scheduled and, after the maintenance activity, a control sample aliquot can be scheduled to be transported to one of the at least two analyzers for validating the diagnostic test by measuring one control sample of the control sample aliquot.

Every eight hours, a calibration measurement can be executed to calibrate, graduate, or adjust the analytical method and, after the calibration measurement, a control sample aliquot can be scheduled to be transported to one of the at least two analyzers for validating the diagnostic test by measuring one control sample of the control sample aliquot.

Every Monday at 8:00 am, a certain maintenance activity and subsequent calibration measurement can be scheduled and, after the maintenance activity and subsequent calibration measurement, a control sample aliquot can be scheduled to be transported to one of the at least two analyzers for validating the diagnostic test by measuring one control sample of the control sample aliquot.

In one embodiment, in step a), the total number of control sample aliquots can be determined based on the number of the at least one time segment and a number of control sample aliquots per time segment. The aliquot volume of a control sample aliquot of one of the at least one time segment can be determined based on the number of validation time points of the one of the at least one time segment. Thus, in step a), the setup of the laboratory system and the given or predetermined validation requirements can be used to determine the smallest possible number of control sample aliquots with largest possible aliquot volumes for each control sample aliquot. This can have the advantage that the sum of all dead volumes and related costs can be reduced to a minimum.

In a further embodiment, the number of control sample aliquots per time segment can be further determined by a maximum number of the at least two analyzers for which at least one same validation time point is defined per time segment. The aliquot volume of a control sample aliquot of one of the at least one time segment can be further determined by the maximum number of the at least two analyzers for which at least one same validation time point can be defined for the one of the at least one time segment. For example:

- If N analyzers, wherein N is a positive integer, have at least one same validation time point in one time segment, then the number of control sample aliquots for this time segment can be multiplied by N.
- If a first group of N+X analyzers, wherein N and X are positive integers, has at least one first same validation time point and a second group of N analyzers has at least one second same validation time point in one time segment, then the number of control sample aliquots for this time segment can be multiplied by N+X.

As used herein, the term "same validation time point" can mean a first validation time point defined for a first analyzer and a second validation defined for a second analyzer if the time duration between the first validation time point defined for the first analyzer and the second validation time point for the second analyzer is too short in order to transport the control sample aliquot from the first analyzer to the second analyzer or from the second analyzer to the first analyzer.

In a specific embodiment, the determined number of control samples required for the number of validation time points of one of the at least one time segment can be distributed to the determined number of control sample aliquots of the one of the at least one time segment so that the aliquot volume difference of each control sample aliquot of the one of the at least one time segment can be equal or less than one volume of a control sample. Accordingly, the number of control samples can be distributed to the number of control sample aliquots as evenly as possible in order to generate control sample aliquots with the smallest possible sample aliquot volume differences. This can have the advantage that the generated aliquots have comparable or similar physical and/or chemical characteristics, which may be important for a comparable handling or processing of control sample leading to comparable validation results.

In one embodiment, the validation time schedule can comprise a defined time period and at least one validation cycle. The validation time schedule defined for one validation cycle a temporal sequence and a number of validation time points at which a control sample aliquot can be scheduled to be transported to one or more of the at least two analyzers for validating the diagnostic test by measuring one control sample. The validation cycle can be repeated a number of times (e.g., X times, wherein X can be an integer) during a defined time period of the validation time schedule.

In a specific embodiment, in step a) of the method, the total number of control sample aliquots can be determined based on a defined time period of the validation time schedule, validation time points per validation cycle, and a control sample aliquot stability time. The aliquot volume for each control sample aliquot can be determined based on the validation time points per validation cycle and the control sample aliquot stability time. The control sample aliquot stability time can be equal to or a multiple of one validation cycle. Accordingly, the number of control sample aliquots can increase by increasing the defined time period or decreasing the control sample aliquot stability time. The aliquot volume for each control sample aliquot can increase by increasing all validation time points of the validation cycle. Thus, in step a), the setup of the laboratory system and the given or predetermined validation requirements can be used to determine the smallest possible number of control sample aliquots with largest possible aliquot volumes for each control sample aliquot. This can have the advantage that the sum of all dead volumes and related costs can be reduced to a minimum.

In a further specific embodiment, in step a) of the method, the total number of control sample aliquots and the aliquot volume for each control sample aliquot can be further determined by a maximum number of the at least two analyzers for which at least one same validation time point is defined per validation cycle. Accordingly, the number of control sample aliquots increases and the aliquot volume of each control sample aliquot can decrease by increasing the maximum number of analyzers for which at least one same validation time point can be defined per validation cycle.

In a more specific embodiment, the total control sample volume can comprise a volume of a first number of control sample aliquots with a first aliquot volume. The first number of control sample aliquots and the first aliquot volume can be calculated as follows:

$$\text{first number of control sample aliquots} = \text{ROUNDDOWN}(((C*D)-(B*((\text{ROUNDUP}((C*D)/B;0))-1)))*((A-(A-((\text{ROUNDDOWN}(A/D;0))*D)))/D);0)$$

$$\text{first aliquot volume} = ((\text{ROUNDUP}((C*D)/B;0))*E)+F$$

where:
A: defined time period of validation time schedule (in days)
B: maximum number of analyzers for which at least one same validation time point per validation cycle is defined
C: validation time points per validation cycle
D: control sample aliquot onboard stability time (in days)
E: volume of one control sample required for validating a diagnostic test once
F: dead volume per control sample aliquot In a further more specific embodiment, the total control sample volume can further comprise a volume of a second number of control sample aliquots with a second aliquot volume. The second number of control sample aliquots and the second aliquot volume can be calculated as follows:

$$\text{second number of control sample aliquots} = \text{ROUNDDOWN}(((B*(\text{ROUNDUP}((C*D)/B;0))-(C*D))*((A-(A-((\text{ROUNDDOWN}(A/D;0))*D)))/D);0)$$

$$\text{second aliquot volume} = (((\text{ROUNDUP}((C*D)/B;0))-1)*E)+F$$

where:
A: defined time period of validation time schedule (in days)
B: maximum number of analyzers for which at least one same validation time point per validation cycle is defined
C: validation time points per validation cycle
D: control sample aliquot onboard stability time (in days)
E: volume of one control sample required for validating a diagnostic test once
F: dead volume per control sample aliquot In a further more specific embodiment, the total control sample volume can further comprise a volume of a third number of control sample aliquots with a third aliquot volume and a volume of a fourth number of control sample aliquots with a fourth aliquot volume. The third number of control sample aliquots, the third aliquot volume, the fourth number of control sample aliquots, and the fourth aliquot volume can be calculated as follows:

third number of control sample aliquots=ROUNDDOWN(((C*(A−((ROUNDDOWN(A/D;0))*D)))−(B*((ROUNDUP((C*(A−((ROUNDDOWN(A/D;0))*D)))/B;0))−1))*((A−((ROUNDDOWN(A/D;0))*D))/((IF(A−((ROUNDDOWN(A/D;0))*D)=0;1;A−((ROUNDDOWN(A/D;0))*D)))));0)

third aliquot volume=((ROUNDUP((C*(A−((ROUNDDOWN(A/D;0))*D)))/B;0))*E)+F fourth number of control sample aliquots=ROUNDDOWN(((B*(ROUNDUP((C*(A−((ROUNDDOWN(A/D;0))*D)))/B;0)))−(C*(A−((ROUNDDOWN(A/D;0))*D))))*((A−((ROUNDDOWN(A/D;0))*D))/((IF(A−((ROUNDDOWN(A/D;0))*D)=0;1;A−((ROUNDDOWN(A/D;0))*D)))));0)

fourth aliquot volume=((((ROUNDUP((C*(A−((ROUNDDOWN(A/D;0))*D)))/B;0))−1))*E)+F where:
A: defined time period of validation time schedule (in days)
B: maximum number of analyzers for which at least one same validation time point per validation cycle is defined
C: validation time points per validation cycle
D: control sample aliquot onboard stability time (in days)
E: volume of one control sample required for validating a diagnostic test once
F: dead volume per control sample aliquot In one embodiment, the method can further comprise the following steps before step a) of the method:
 displaying, by the control unit, a validation time schedule on the user interface of the control unit;
 confirming or refusing, by an operator using the user interface, to use the displayed validation time schedule as validation time schedule for step a) of the method; and
 configuring, by the operator using the user interface, the displayed validation time schedule if the displayed validation time schedule was refused and confirming, by the operator using the user interface, to use the configured validation time schedule as validation time schedule for step a) of the method.

In one embodiment, the displayed validation time schedule can comprise a defined time period, a predefined number of time segments of predefined lengths, and predefined validation time points for each of the at least two analyzers and for each of the predefined number of time segments. Alternatively, the displayed time schedule can be a configurable validation time schedule template.

In one embodiment, configuring the displayed validation time schedule can comprise at least one of the following steps:
 specifying a diagnostic test for which the validation time schedule can be configured;
 specifying the control samples for validating the diagnostic test (e.g., control sample onboard stability time);
 defining a time period of the validation time schedule;
 specifying validation time points for each of the at least two analyzers according to validation requirements (e.g., validation time intervals, predefined times, predefined days, predefined number of executed diagnostic tests, and/or predefined events);
 specifying the number of time segments; and
 specifying the length of each time segment For example, the operator may configure a validation time schedule with a time period of three days for five analyzers using control samples with a control sample onboard stability time of 16 hours. Based on the defined time period and a given control sample onboard stability time, the resulting validation time schedule can comprise four time segments of 16 hours and one time segment of 8 hours. Based on validation requirements of the five analyzers, validation time points for each time segment can be determined. Finally, based on the number of time segments and validation time points for the five analyzers within each time segment, the total number of control sample aliquots and aliquot volumes for each control sample aliquot can be determined and the operator can provide the one or more vessels containing the total control sample volume. Thus, by defining the time period of the validation time schedule, the operator can advantageously configure the validation time schedule according to his work schedule and/or workload.

In one embodiment, the method can further comprise the following steps after step a) and before step b) of the method:
 calculating, by the control unit, the total control sample volume based on the determined total number of control sample aliquots and aliquot volume for each control sample aliquot; and
 displaying, by the control unit, the total control sample volume and instructions to provide the one or more vessels containing the total control sample volume on a user interface of the control unit In one embodiment, the laboratory system can further comprise a loading station and providing the one or more vessels containing the total control sample volume can comprise the following step:
 loading, by an operator, the one or more vessels containing the total control sample volume on the loading station.

In one embodiment, the loading station may be comprised by the aliquoting device.

In an alternative embodiment, the loading station may be separate from the aliquoting device or reconstitution device, operatively connected to the transport system, and communicatively connected to the control unit. After loading the one or more vessels containing the total control sample volume on the loading station, the control unit can control the transportation system to transport the one or more vessels containing the total control sample volume from the loading station to the aliquoting device or reconstitution device.

In another embodiment, the method can further comprise the following step:
e) controlling, by the control unit, the transport system to transport the at least one control sample aliquot between the storage and the at least two analyzers for validating the diagnostic test by measuring one control sample of the at least one control sample aliquot according to the validation time schedule.

In a specific embodiment, step e) of the method can further comprise:

controlling, by the control unit, the transport system to transport the at least one control sample aliquot to the storage when the duration between step c) and a first validation time point or the duration between two subsequent validation time points exceeds a defined time threshold.

Accordingly, the control sample aliquot can always be available for validating a diagnostic test by measuring one control sample of the control sample aliquot and at the same time the control sample aliquot can be kept longer on the laboratory system by providing optimal control sample storage conditions (e.g., storage at about 4° C. and/or optimal humidity). Therefore, the risk of incorrect test results, test result delays or operation downtime as well as the number of required control sample aliquots and corresponding dead volumes can be reduced.

If the generated total number of control sample aliquots comprises the at least one control sample aliquot and further control sample aliquots and if, according to the validation time schedule, the at least one control sample aliquot is scheduled to be transported to one of the at least two analyzers right after step c), e.g., because the operator is providing one or more vessels containing the total control sample volume right before the validation time schedule starts, then the at least one control sample aliquot can be transported to one of the at least two analyzers and the further control sample aliquots can be transported to the storage.

If the generated total number of control sample aliquots comprises the at least one control sample aliquot and further control sample aliquots and if, according to the validation time schedule, the at least one control sample aliquot is not scheduled to be transported to one of the at least two analyzers right after step c), e.g., because the operator is providing one or more vessels containing the total control sample volume some time before the validation time schedule starts, then the at least one control sample aliquot and the further control sample aliquots can be transported to the storage before the at least one control sample aliquot is transported to one of the at least two analyzers when the validation time schedule starts. Thus, the operator can provide one or more vessels containing the total control sample volume not only for the next validation time schedule but also for future validation time schedules. This may be advantageous, if the next validation time schedule or future validation schedule starts at a time when the operator is not available to provide the one or more vessels containing the total control sample volume. Accordingly, the walk-away time of the laboratory system can be improved.

In a further embodiment, the method can further comprise the following steps after step e) of the method:

controlling, by the control unit, the transport system to transport at least one further control sample aliquot from the storage to one of the at least two analyzers for validating the diagnostic test by measuring one control sample of the at least one further control sample aliquot controlling, by the control unit, the transport system to transport the at least one further control sample aliquot between the storage and the at least two analyzers for validating the diagnostic test by measuring one control sample of the at least one further aliquot according to the validation time schedule.

As further control sample aliquots stored in the storage can be transported out of the storage in order to make them available as soon as a control sample aliquot is required for validating the diagnostic test by measuring one control sample of the control sample aliquot, the risk of incorrect test results, test result delays or operation downtime can further be reduced.

In one embodiment, the laboratory system can comprise an additional storage. The additional storage can be operatively connected to the transport system and communicatively connected to the control unit. The storage can be configured for temporary storage of control sample aliquots and the additional storage can be configured for long-term-storage of control sample aliquots. Step d) of the method can further comprise:

controlling, by the control unit, the transport system to transport the at least one control sample aliquot to the storage for temporary storage or to one of the at least two analyzers for validating the diagnostic test by measuring one control sample of the at least one control sample aliquot and further control sample aliquots to the additional storage for long-term storage according to the validation time schedule and to transport the at least one control sample aliquot and the further control sample aliquots to the additional storage for long-term storage before the at least one control sample aliquot is transported to the storage for temporary storage or to one of the at least two analyzers for validating the diagnostic test by measuring one control sample of the at least one control sample aliquot according to the validation time schedule.

As used herein, the term "additional storage" can relate to a cabinet of various sizes, which can be configured for long-term storage of a plurality of control sample aliquots in storage racks or carrier systems, which can be transported into and out of the storage through a gate. The additional storage can comprise a tempering unit to hold the ambient temperature for the control sample aliquots within the additional storage below about 0° C. and possibly below about −2° C. As used herein, the term "long-term-storage" can relate to a time duration which can be equal to or longer than a time segment or control sample aliquot onboard stability time, e.g., control sample aliquots within the additional storage can be stored at about −20° C. and can therefore be kept longer on the laboratory system than a control sample aliquot onboard stability time. As the control sample aliquots can be kept longer on the laboratory system, more control sample aliquots for a longer defined time period can be generated and, therefore, the operator can have to provide one or more vessels containing the total control sample volume less often which improves the walk-away time. If the laboratory system comprises a storage and an additional storage, the storage can comprise a tempering unit to hold the ambient temperature for the control sample aliquots within the storage between about 4° C. and room temperature. As used herein, the term "temporary storage" can relate to a time duration, which can be shorter than a time segment or control sample aliquot onboard stability time, e.g., control sample aliquots within the storage can be kept at about 4° C. during a time segment and can be therefore quickly available for validating, as no thawing time is required. In one embodiment, the additional storage can comprise a control sample aliquot handler configured to position or insert a control sample aliquot into a storage rack or carrier system, e.g., for transferring control sample aliquots between storage racks and carrier systems. In its inside, the storage may comprise a plurality of shelves for the storage of a number of storage racks or carrier systems in predefined storage positions. The storage may further have, in addition or alternatively to shelves, compartmented trays or inserts for the racks or carrier systems. Further, shelves or compartments with different heights may be provided in order to be able to optimize available space when storing control sample aliquots of different heights. In a specific embodiment, the long-term storage can be a freezer operatively connected to the transport system.

If the generated total number of control sample aliquots comprises at least one control sample aliquot and further control sample aliquots and if, according to the validation time schedule, the at least one control sample aliquot is scheduled to be transported to the storage for temporary storage or to one of the at least two analyzers right after step c), then the at least one control sample aliquot can be transported to the storage for temporary storage or to one of the at least two analyzers and the further control sample aliquots can be transported to the additional storage for long-term storage.

If the generated total number of control sample aliquots comprises at least one control sample aliquot and further control sample aliquots and if, according to the validation time schedule, the at least one control sample aliquot is not scheduled to be transported to the storage for temporary storage or to one of the at least two analyzers right after step c), then the at least one control sample aliquot and the further control sample aliquots can be transported to the additional storage for long-term storage before the at least one control sample aliquot is transported to the storage for temporary storage or to one of the at least two analyzers when the validation time schedule starts. Thus, the operator can provide one or more vessels containing the total control sample volume not only for the next validation time schedule but also for future validation time schedules. This may be advantageous, if the next validation time schedule or future validation schedule starts at a time when the operator is not able to provide the one or more vessels containing the total control sample volume. Accordingly, the walk-away time of the laboratory system can be improved.

In a further embodiment, the method can further comprise the following steps:

f) controlling, by the control unit, the transport system to transport at least one further control sample aliquot from the additional storage to the storage for temporary storage or to one of the at least two analyzers for validating the diagnostic test by measuring one control sample of the at least one further control sample aliquot g) controlling, by the control unit, the transport system to transport the at least one further aliquot of control samples between the storage for temporary storage and the at least two analyzers for validating the diagnostic test by measuring one control sample of the at least one further aliquot according to the validation time schedule.

As further control sample aliquots stored in the additional storage can be transported out of the additional storage in order to make them available as soon as a control sample aliquot is required for validating the diagnostic test by measuring one control sample of the control sample aliquot, the risk of incorrect test results, test result delays or operation downtime can further be reduced.

In one embodiment, each generated control sample aliquot can comprise a unique control sample aliquot identity associated with at least a control sample aliquot onboard stability time. The laboratory system can further comprises a disposal unit, which can be operatively connected to the transport system. The storage, the at least two analyzers, and the transport system can have defined temperatures and the storage and the at least two analyzers can comprise a reader configured to read the unique control sample aliquot identity. The method can further comprise the following steps:

h) reading, by the reader, the unique control sample aliquot identity each time a control sample aliquot arrives at or leaves the storage and one or more of the at least two analyzers i) generating, by the reader, a time stamp when reading the unique control sample aliquot identify j) calculating, by the control unit, a time duration at which the control sample aliquot was kept at one or more defined temperatures, a time duration during which the control sample aliquot was undergone a number of temperature changes, or a time duration during which the control sample aliquot was transported a number of times to the one or more of the at least two analyzers based on the generated time stamps k) comparing, by the control unit, the calculated time duration with the control sample aliquot onboard stability time l) controlling, by the control unit, the transport system to transport the control sample aliquot to the disposal unit if the calculated time period exceeds the control sample aliquot onboard stability time.

As used herein, the term "unique control sample aliquot identity" can relate to an identifier for the distinct identification of each control sample aliquot. The unique control sample aliquot identity can be associated with at least a control sample aliquot onboard stability time. The unique control sample aliquot identity may be associated with further control sample attributes or information such as manufacturing information (e.g., lot information) or composition information (e.g., analyte(s), concentration(s), additives, and the like). The unique control sample aliquot identity may be a tag attached at the control sample aliquot tube. For example, the unique control sample aliquot identity may be a barcode or radio-frequency identification tag (RFID tag) attached at the control sample aliquot tube. The unique control sample aliquot identity and the associated control sample aliquot onboard stability time and further control sample attributes may be stored in a database, which can be communicatively connected to the control unit. Alternatively, the unique control sample aliquot identity and the associated control sample aliquot onboard stability time and further control sample attributes may be stored on the RFID tag.

As used herein, the term "reader" can relate to a device configured to read the unique control sample aliquot identity. For example, the reader may be a barcode reader, an RFID reader, or a camera. Alternatively, the reader may be a RFID reader/writer comprising also writing capabilities.

As used herein, the term "disposal unit" can relate to a device configured to dispose control sample aliquots whose control sample aliquot onboard stability times have elapsed and are therefore no longer viable for validating the diagnostic test. In one embodiment, the disposal unit can be spatially separate from the storage or the at least two analyzers. In another embodiment, the disposal unit may be comprised by the storage or by one or more of the at least two analyzers.

In one embodiment, the laboratory system can comprise an additional storage, wherein the additional storage can have a defined temperature, wherein the additional storage can comprise an additional reader configured to read the unique control sample aliquot identity, wherein step h) of the method can further comprise:

reading, by the additional reader, the unique control sample aliquot identity each time the control sample aliquot arrives at or leaves the additional storage, wherein step i) of the method can further comprise:

generating, by the additional reader, a time stamp when reading the unique control sample aliquot identify.

In one embodiment, the laboratory system can further comprise a closure removal device configured to remove closures on the control sample aliquot tubes and a closure fitting device for fitting closures on the control sample aliquot tubes, or a closure removal/fitting device configured to remove/fit closures on the control sample aliquot tubes, wherein the closure removal device and the closure fitting device, or the closure removal/fitting device can comprise an additional reader for reading the unique control sample aliquot identity, wherein step h) of the method can further comprises:

reading, by the additional reader, the unique control sample aliquot identity each time the control sample aliquot tube is closed and opened by the closure removal device and the closure fitting device, or by the closure removal/fitting device, wherein step i) of the method can further comprise:

generating, by the additional reader, a time stamp when reading the unique control sample aliquot identify, wherein step j) of the method can further comprise:

calculating, by the control unit, a time duration at which the control sample aliquot was kept at one or more opened status.

In one embodiment, each vessel of the one or more vessels can comprise a unique vessel identity, wherein the unique vessel identity can be associated with at least the control sample onboard stability time, wherein step c) of the method can further comprises:

assigning, by the control unit, the control sample onboard stability time associated with the unique vessel identity to each unique control sample aliquot identity of each generated control sample aliquot.

The present disclosure also relates to a laboratory system to provide control samples for validating a diagnostic test within a laboratory system. The laboratory system can comprise an aliquoting device configured to generate control sample aliquots from a total control sample volume, a storage configured to store control sample aliquots, a transport system configured to transport control sample aliquots, at least two analyzers configured to execute the diagnostic test and to validate the diagnostic test by measuring one control sample, and a control unit. The aliquoting device, the storage, and the at least two analyzers can be operatively connected to the transport system. The aliquoting device, the storage, the transport system, and the at least two analyzers can be communicatively connected to the control unit. The laboratory system can be configured to execute the steps a) to e) of the method to provide control samples for validating a diagnostic test within a laboratory system as described herein.

In one embodiment of the laboratory system, the laboratory system can further comprise a reconstitution device configured to reconstitute the lyophilized control samples to the total control sample volume before providing the one or more vessels to the aliquoting device.

In one embodiment, the laboratory system can comprise an addition storage. The addition storage can be operatively connected to the transport system and communicatively connected to the control unit. The storage can be configured for temporary storage of control sample aliquots and the additional storage can be configured for long-term-storage of control sample aliquots. The laboratory system can be configured to execute the steps a) to g) of the method to provide control samples for validating a diagnostic test within a laboratory system as described herein.

In a further embodiment, the laboratory system can further comprise a disposal unit, which can be operatively connected to the transport system. The storage, the at least two analyzers, and the transport system can have defined temperatures and the storage and the at least two analyzers can comprise a reader configured to read a unique control sample aliquot identity. The laboratory system can be configured to execute the steps a) to e) and steps h) to l) of the method to provide control samples for validating a diagnostic test within a laboratory system as described herein.

In one embodiment of the laboratory system, the laboratory system can comprise an additional storage. The additional storage can have a defined temperature and the additional storage can comprise an additional reader configured to read the unique control sample aliquot identity. The laboratory system can be configured to execute steps a) to l) and to further execute during step h) of the method:

reading, by the additional reader, the unique control sample aliquot identity each time the control sample aliquot arrives at or leaves the additional storage.

The laboratory system can be configured to further execute during step i) of the method:

generating, by the additional reader, a time stamp when reading the unique control sample aliquot identify.

In one embodiment of the laboratory system, the laboratory system can further comprise a closure removal device configured to remove closures on the aliquots and a closure-fitting device for fitting closures on aliquot, or a closure removal/fitting device configured to remove/fit closures on aliquots. The closure removal device and the closure-fitting device, or the closure removal/fitting device can comprise an additional reader for reading the unique control sample aliquot identity. The laboratory system can be configured to execute steps a) to l) and to further execute during step h) of the method:

reading, by the additional reader, the unique control sample aliquot identity each time the control sample aliquot is closed or opened by the closure removal device and the closure fitting device, or by the closure removal/fitting device.

The laboratory system can be configured to further execute during step i) of the method:

generating, by the additional reader, a time stamp when reading the unique control sample aliquot identify.

The laboratory system can be configured to further execute during step i) of the method:

calculating, by the control unit, a time duration at which the control sample aliquot was kept at one or more opened status.

The present disclosure can further relate to computer program comprising instructions to cause the laboratory system as described herein to execute the steps of the method to provide control samples for validating a diagnostic test within a laboratory system as described herein.

The present disclosure can further relate to computer-readable storage medium having stored thereon the computer program comprising instructions to cause the laboratory system as described herein to execute the steps of the method to provide control samples for validating a diagnostic test within a laboratory system as described herein.

Referring initially to FIG. 1, in FIG. 1 a schematic representation of a laboratory system (38) to provide control samples (36) for validating a diagnostic test within the laboratory system (38) is shown. The laboratory system (38) can comprise an aliquoting device (40) configured to generate control sample aliquots (42) from a total control sample volume (44) comprised in one or more vessels (62). The laboratory system (38) can further comprise a storage (46) configured to store control sample aliquots (42). As shown in FIG. 1 carrier systems (47) can receive, hold, transport, and/or release control sample aliquots (42). The laboratory system (38) can further comprise at least two analyzers (50, 52) configured to execute the diagnostic test and to validate the diagnostic test by measuring one control sample (36). In the shown embodiment, each of the at least two analyzers (50, 52) can be an analyzer module of a modular analyzer system of two separate modular analyzer systems (51, 53), wherein each modular analyzer system can comprise four analyzer modules. The laboratory system (38) can further comprise a transport system (48) configured to transport carrier systems (47) loaded with control sample aliquots (42) between the aliquoting device (40), the storage (46), and the at least two analyzers (50, 52) which can be operatively connected to the transport system (48). The laboratory system (38) can further comprise a control unit (54) which can be communicatively connected to the aliquoting device (40), the storage (46), and the at least two analyzers (50, 52) as indicated by the dashed lines in FIG. 1. The control unit (54) can comprise a user interface (80) for displaying and/or configuring a validation time schedule (58) or information about number of vessels (62) and total control sample volume (44) to be provided for validating a diagnostic test within the laboratory system (38) according to the validation time schedule (58). The control unit (54) can further comprise a computer-readable storage medium (78) having stored thereon the computer program comprising instructions to cause the laboratory system (38) to execute the steps (12, 14, 16, 18, 20, 22, 24, 26, 28, 30, 32, 34) of the method (10) as described in more detail in FIG. 2 and FIG. 6. In the shown embodiment, the laboratory system (38) can comprise an additional storage (70) configured for long-term storage of control sample aliquots (42) and a disposal unit (74) for disposing control sample aliquots whose control sample aliquot onboard stability times (68) have elapsed and are therefore no longer viable for validating a diagnostic test. If the laboratory system (38) comprises a storage (46) and an additional storage (70), the storage can be configured for temporary storage of control sample aliquots. As further shown in FIG. 1, the storage (46), the additional storage (70), and the at least two analyzers (50, 52) can comprise a reader (76) configured to read an unique control sample aliquot identity (72) of a control sample aliquot (42) and to generate a time stamp each time the control sample aliquot (42) arrives at or leaves the storage (46), the additional storage (70), and the at least two analyzers (50, 52).

Figure 2A:
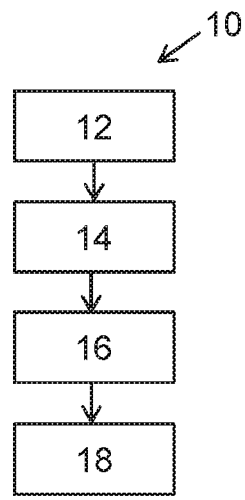
FIGS. 2A-D illustrate flowcharts of the method to provide control samples for validating a diagnostic test within a laboratory system according to an embodiment of the present disclosure.

FIGS. 2A-D depict flowcharts of embodiments of the method (10) to provide control samples (36) for validating a diagnostic test within a laboratory system (38). As shown in FIG. 1, the laboratory system (38) can comprise an aliquoting device (40), a storage (46), a transport system (48), at least two analyzers (50, 52), and a control unit (54). FIG. 2A shows a first embodiment of the method (10) where in step a) (12) of the method (10), the control unit (54) can determine a total number of control sample aliquots (42) and an aliquot volume (56) for each control sample aliquot (42) based on a validation time schedule (58) as further described in FIGS. 3-6 below. Then, one or more vessels (62) containing the total control sample volume (44) can be provided to the aliquoting device (40) in step b) (14) of the method (10). The total control sample volume (44) can be at least the sum of aliquot volumes (56) of the total number of control sample aliquots (42). Subsequently, the aliquoting device (40) can generate the determined total number of control sample aliquots (42) with the determined aliquot volumes (56) in step c) (16) of the method (10). In step d) (18) of the method (10), the control unit (54) can control the transport system (48) to transport at least one control sample aliquot (42) to the storage (46) or to one of the at least two analyzers (50, 52) for validating the diagnostic test by measuring one control sample (36) of the at least one control sample aliquot (42) according to the validation time schedule (58).

Figure 2B:
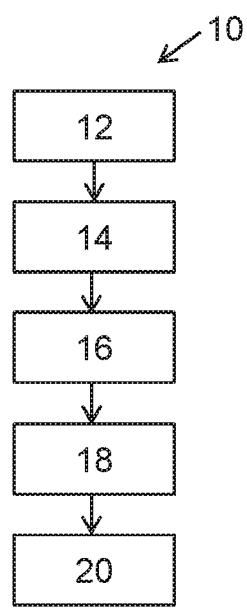

In a second embodiment of the method (10) as shown in FIG. 2B, after step d) (18) of the method (10) of the first embodiment, the control unit (54) can control the transport system (48) in step e) (20) of the method (10) to transport the at least one control sample aliquot (42) between the storage (46) and the at least two analyzers (50, 52) for validating the diagnostic test by measuring one control sample (36) of the at least one control sample aliquot (42) according to the validation time schedule (58).

Figure 2C:
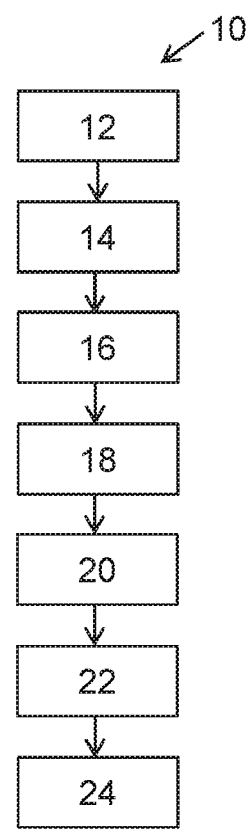

FIG. 2C shows a third embodiment of the method (10) if the laboratory system (38) comprises a storage (46) and an additional storage (70). Steps a) to c) (12, 14, 16) of the third embodiment of the method (10) are the same steps a) to c) (12, 14, 16) as described above for the first embodiment. However, in step d) (18) of the method (10), the control unit (54) can control the transport system (48) to transport the at least one control sample aliquot (42) to the storage (46) for temporary storage or to one of the at least two analyzers (50, 52) for validating the diagnostic test by measuring one control sample (36) of the at least one control sample aliquot (42) if, according to the validation time schedule (58), the at least one control sample aliquot (42) is scheduled to be transported to the storage (46) for temporary storage or to one of the at least two analyzers (50, 52) right after step c) (16) of the method (10). Further control sample aliquots (42) can be transported to the additional storage (70) for long-term storage. If, according to the validation time schedule (58), the at least one control sample aliquot (42) is not scheduled to be transported to the storage (46) for temporary storage or to one of the at least two analyzers (50, 52) right after step c) (16), the at least one control sample aliquot (42) and the further control sample aliquots (42) can be transported to the additional storage (70) for long-term storage before the at least one control sample aliquot (42) is transported to the storage (46) for temporary storage or to one of the at least two analyzers (50, 52) when the validation time schedule (58) starts. After the at least one control sample aliquot (42) has been transported to the storage (46) for temporary storage or to one of the at least two analyzers (50, 52), the control unit (54) can control the transport system (48) in step e) (20) of the method (10) to transport the at least one control sample aliquot (42) between the storage (46) and the at least two analyzers (50, 52) for validating the diagnostic test by measuring one control sample (36) of the at least one control sample aliquot (42) according to the validation time schedule (58). For the next time segment (64) of the validation time schedule (58), or if no control samples (36) are left in the at least one control sample aliquot (42), or if the control sample aliquot onboard stability time (68) has elapsed, the control unit (54) can control in step f) (22) of the method (10) the transport system (48) to transport at least one further control sample aliquot (42)

from the additional storage (70) to the storage (46) for temporary storage or to one of the at least two analyzers (50, 52) for validating the diagnostic test by measuring one control sample (36) of the at least one further control sample aliquot (42). After step f) (22) of the method (10), the control unit (54) can control in step g) (24) of the method (10) the transport system (48) to transport the at least one further control sample aliquot (42) between the storage (46) for temporary storage and the at least two analyzers (50, 52) for validating the diagnostic test by measuring one control sample (36) of the at least one further aliquot (42) according to the validation time schedule (58).

Figure 2D:
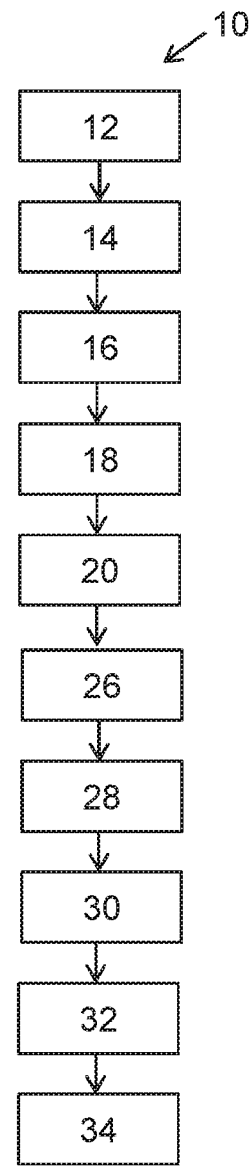

In FIG. 2D, a fourth embodiment of the method (10) is shown if each generated control sample aliquot (42) comprises a unique control sample aliquot identity (72) associated with at least a control sample aliquot onboard stability time (68) which can be used for tracking and controlling the disposal of the at least one control sample aliquot (42) on the laboratory system (38). Thus, the laboratory system (38) can further comprise a disposal unit (74) which can be operatively connected to the transport system (48). The storage (46), the at least two analyzers (50, 52), and the transport system (48) can have defined temperatures. Furthermore, the storage (46) and the at least two analyzers (50, 52) can comprise a reader (76) configured to read the unique control sample aliquot identity (72). Steps a) to e) (12, 14, 16, 18) of the fourth embodiment of the method (10) can be the same steps a) to e) (12, 14, 16, 18) as described above for the second embodiment. In step h) (26) of the method (10), the reader (76) of the storage (46) and one or more of the at least two analyzers (50, 52) can read the unique control sample aliquot identity (72) each time a control sample aliquot (42) arrives at or leaves the storage (46) and one or more of the at least two analyzers (50, 52). Then, in step i) (28) of the method (10), the reader (76) of the storage (46) and one or more of the at least two analyzers (50, 52) can generate a time stamp when reading the unique control sample aliquot identify (72). Based on the generated time stamps, the control unit (54) can calculate in step j) (30) a time duration at which the control sample aliquot (42) was kept at one or more defined temperatures, a time duration during which the control sample aliquot (42) had undergone a number of temperature changes, or a time duration during which the control sample aliquot (42) was transported a number of times to the one or more of the at least two analyzers (50, 52). Subsequently, the control unit (54) can compare the calculated time duration with the control sample aliquot onboard stability time (68) in step k) (32) of the method (32). Finally, in step l) (34) of the method (10), the control unit (54) can control the transport system (48) to transport the control sample aliquot (42) to the disposal unit (74) if the calculated time period exceeds the control sample aliquot onboard stability time (68).

Figures 3A, 3B:
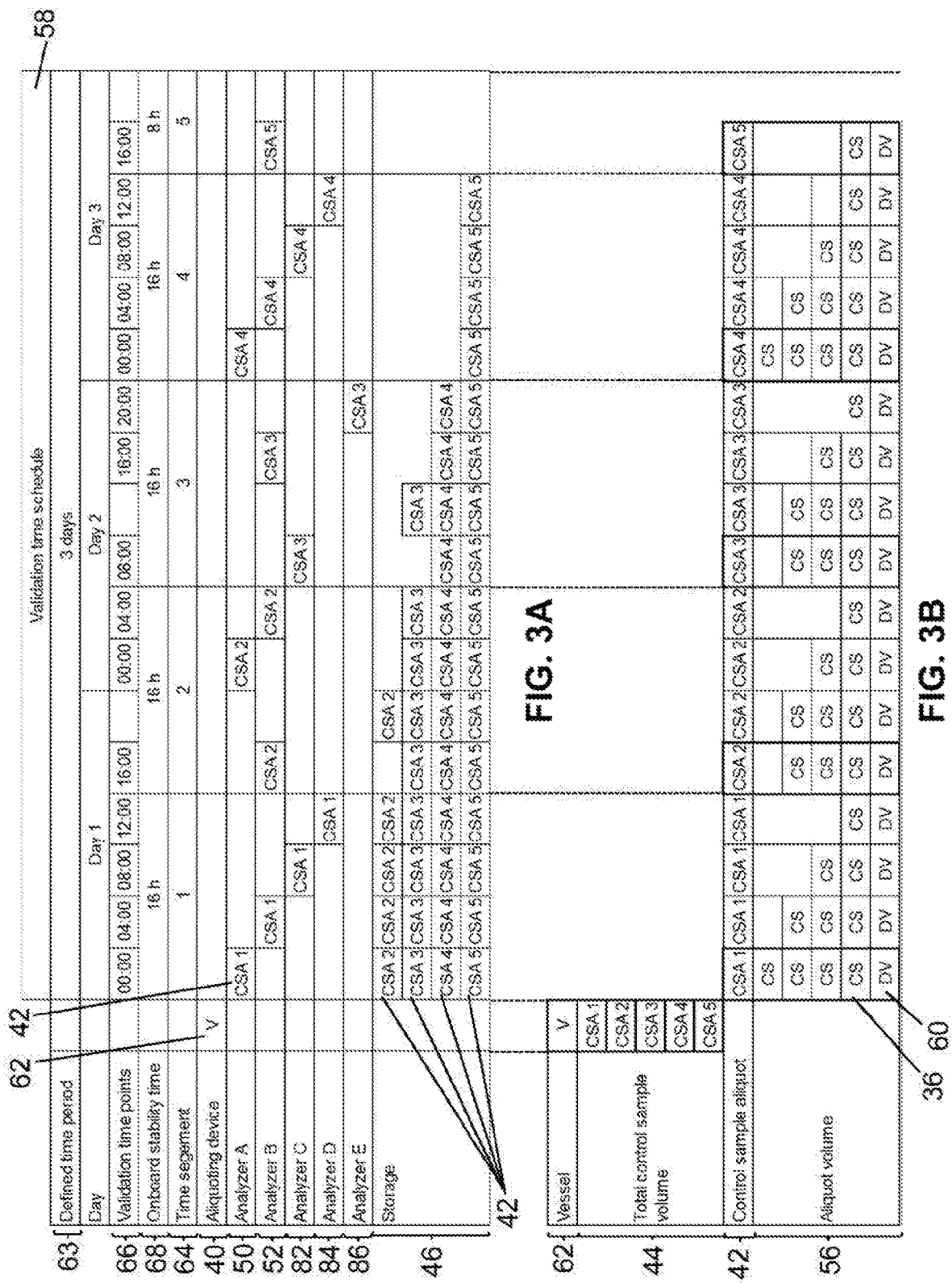
FIGS. 3A-B illustrate an example of a validation time schedule, control sample aliquots, and course of aliquot volumes during each time segment of the validation schedule according to an embodiment of the present disclosure.

FIG. 3A depicts an example of a validation time schedule (58). The shown validation time schedule (58) can comprise five time segments (64), time segment 1 to time segment 5, for a defined time period (63) of three days. The shown time segments (64) can have different lengths. Time segment 1 to time segment 4 can have a length of a control sample aliquot onboard stability time (68) of 16 hours. The last time segment 5 can have a length of eight hours, which can be only a half of the control sample aliquot onboard stability time (68). In the shown example, the validation time schedule (58) defined for five analyzers (50, 52, 82, 84, 86), analyzer A to analyzer E, and for each of the five time segments (64) a number of validation time points (66) at which a control sample aliquot (42, CSA) can be scheduled to be transported to one or more of the five analyzers (50, 52, 82, 84, 86) for validating the diagnostic test by measuring one control sample (36, CS) of the control sample aliquot (42, CSA). As shown in FIG. 3A, at the first validation time point (00:00) of the first time segment 1, a first control sample aliquot CSA 1 can be scheduled to be transported to analyzer A (50), at the second validation time point (04:00) of the first time segment 1, the first control sample aliquot CSA 1 can be scheduled to be transported to analyzer B (52), and so on. As further shown, control sample aliquots CSA 2 to CSA 5 can be stored in the storage (46) during the first time segment 1 as they can be scheduled to be transported to one or more of the five analyzers (50, 52, 82, 84, 86) only after the first time segment 1. Control sample aliquot CSA 2 can be scheduled to be transported to analyzer B (52) at the first validation time point (00:00) of the second time segment 2. As the second validation point of time segment 2 is at 00:00 of the next day, control sample aliquot CSA 2 can be transported from analyzer B (52) back to the storage (46) before it can then be transported to analyzer A (50) at the second validation point of time segment 2. Thus, the control unit (54) can control the transport system (48) to transport the control sample aliquot CSA 2 to the storage (46) when the duration between two subsequent validation time points exceeds a defined time threshold. The control sample aliquot CSA 3 can be transported to one or more of the five analyzers (50, 52, 82, 84, 86) or to the storage (46) according to the validation time points (66) of the third time segment 3 of the validation time schedule (58), the control sample aliquot CSA 4 can be transported to one or more of the five analyzers (50, 52, 82, 84, 86) or the storage (46) according to the validation time points (66) of the fourth time segment 4 of the validation time schedule (58), and the control sample aliquot CSA 5 can be transported to one or more of the five analyzers (50, 52, 82, 84, 86) or the storage (46) according to the validation time points (66) of the fifth time segment 5 of the validation time schedule (58).

FIG. 3B shows control sample aliquots (42, CSA) and course of aliquot volumes (56) during each time segment (62) of the validation schedule (58) as shown in FIG. 3A above. In the shown example, the total number of control sample aliquots (42, CSA) for validating a diagnostic test according to the validation time schedule (58) can be determined based on the number time segments (64). The aliquot volume (56) of a control sample aliquot (42, CSA) of one of the time segments (64) can be determined based on the number of validation time points (66) of the one of the time segments (64). Thus, for validating a diagnostic test according to the validation time schedule (58) as shown in FIG. 3A, five control sample aliquots (42, CSA), control sample aliquot CSA 1 to control sample aliquot CSA 5, can be required. As for time segment 1 and time segment 4, four validation time points can be defined, the aliquot volume of control sample aliquot CSA 1 and the aliquot volume of control sample aliquot CSA 4 can comprise a dead volume (60, DV) and a volume comprising four control samples (36, CS) each with a volume required for validating a diagnostic test once. As for time segment 2 and time segment 3, three validation time points can be defined, the aliquot volume of control sample aliquot CSA 2 and the aliquot volume of control sample aliquot CSA 3 can comprise a dead volume (60, DV) and a volume comprising three control samples (36, CS) each with a volume required for validating a diagnostic test once. As for the last time segment 5, only one validation time point can be defined, the aliquot volume of control sample aliquot CSA 5 can comprise a dead volume (60, DV) and a volume comprising one control sample (36, CS) with a volume required for validating a diagnostic test once. As further shown in FIG. 3B, after each validation time point of a time segment, the aliquot volume (56) of the corresponding transported control sample aliquot (42, CSA) can comprise one control sample (36, CS) less as one control sample (36, CS) can be aspirated by one of the five analyzers (50, 52, 82, 84, 86) for subsequent measuring of the control sample (36, CS). For example, the aliquot volume of control sample aliquot CSA 1 can comprise a dead volume (60, DV) and a volume comprising four control samples (36, CS) each with a volume required for validating a diagnostic test once before it is transported to analyzer A (50) at the first validation time point (00:00) of time segment 1. After the first validation time point (00:00) of time segment 1, the aliquot volume of control sample aliquot CSA 1 can comprise a dead volume (60, DV) and a volume comprising three control samples (36, CS), each with a volume required for validating a diagnostic test once.

FIGS. 3A and 3B also show that before the first validation time point (00:00) of the first time segment 1, a vessel (62) containing the total control sample volume (44) can be provided to the aliquoting device (40). The total control sample volume (44) can be at least the sum of aliquot volumes (56) of the five control sample aliquots CSA 1 to CSA 5 as indicated by thick outside borders.

FIG. 4A depicts another example of a validation time schedule (58). Only the first two time segments (64), time segment 1 and time segment 2, of the validation time schedule (58) are shown. In the shown example, the validation time schedule (58) defined for five analyzers A to E (50, 52, 82, 84, 86) and for each of the two shown time segments (64), a number of validation time points (66) at which a control sample aliquot (42, CSA) can be scheduled to be transported to one or more of the five analyzers (50, 52, 82, 84, 86) for validating the diagnostic test by measuring one control sample (36, CS) of the control sample aliquot (42, CSA). As shown in FIG. 4A, for the two analyzers A and B (50, 52), the same first validation time point (00:00) was defined in time segment 1. Accordingly, two control sample aliquots (42, CSA), control sample aliquots CSA 1 and CSA 2, can be determined for time segment 1 of the validation time schedule (58). Thus, at the first validation time point (00:00) of the first time segment 1, the control sample aliquot CSA 1 can be scheduled to be transported to analyzer A (50) and control sample aliquot CSA 2 can be scheduled to be transported to analyzer B (52). The first control sample aliquot CSA 1 can then be transported to analyzer C (82) at the second validation time point (04:00) of the first time segment 1. As the third validation point of time segment 1 is at 12:00, control sample aliquot CSA 2 can be transported from analyzer B (52) back to the storage (46) before it can then be transported to analyzer D (84) at the third validation point of time segment 1. Control sample aliquots CSA 3, CSA 4, and CSA 5 can be stored in the storage (46) during the first time segment 1 as they can be scheduled to be transported to one or more of the five analyzers (50, 52, 82, 84, 86) only during the second time segment 2. In time segment 2 of the validation time schedule (58), for the three analyzers A, B and E (50, 52, 86), a same first validation time point (16:00) was defined and, for the two analyzers C and D (82, 84), a same second validation time (00:00) was defined. Accordingly, three control sample aliquots (42, CSA), control sample aliquot CSA 3 to control sample aliquot 5, can be determined for time segment 2 of the validation time schedule (58). Thus, at the first validation time point (16:00) of the second time segment 2, the control sample aliquot CSA 3 can be scheduled to be transported to analyzer A (50), the control sample aliquot CSA 4 can be scheduled to be transported to analyzer B (52), and the fifth control sample aliquot CSA 5 can be scheduled to be transported to analyzer E (86). As the second validation point of time segment 2 is at 00:00 of the next day, control sample aliquot CSA 3 and control sample aliquot CSA 4 can be transported from analyzer A (50) and analyzer B (52) back to the storage (46) before they can then be transported to analyzer C (82) and analyzer D (84) at the second validation point (00:00) of time segment 2.

FIG. 4B shows required control sample aliquots (42, CSA) and course of aliquot volumes (56) during each shown time segment (64) of the validation schedule (58) as shown in FIG. 4A above. The total number of control sample aliquots (42) for validating a diagnostic test according to the validation time schedule (58) can be determined based on the number of time segments (64) and the maximum number of the five analyzers (50, 52, 82, 84, 86) for which at least one same validation time point (66) can be defined per time segment (64). The aliquot volume (56) of a control sample aliquot (42, CSA) of one of the time segments (64) can be determined based on the number of validation time points (66) of the one of the time segments (64) and the maximum number of the five analyzers (50, 52, 82, 84, 86) for which at least one same validation time point (66) can be defined for the one of the at least one time segment (64). In the shown example, for validating a diagnostic test according to the validation time schedule (58) as shown in FIG. 4A, two control sample aliquots (42, CSA), control sample aliquot CSA 1 and control sample aliquot CSA 2, can be determined for the first time segment 1 and three control sample aliquots (42, CSA), control sample aliquot CSA 3 to control sample aliquot CSA 5, can be determined for the second time segment 2. As for time segment 1, four validation time points can be defined for the five analyzers A to E (50, 52, 82, 84, 86) and two control sample aliquots can be determined, the aliquot volume of control sample aliquot CSA 1 and the aliquot volume of control sample aliquot CSA 2 can comprise a dead volume (60, DV) and a volume comprising two control samples (36, CS), each with a volume required for validating a diagnostic test once. For time segment 2, five validation time points can be defined for the five analyzers A to E (50, 52, 82, 84, 86) and three control sample aliquots can be determined. The five control samples (36, CS) required for the five validation time points (66) can now be distributed to three control sample aliquots (42, CSA) so that the aliquot volume (56) difference of control sample aliquot CSA 3, CSA 4, and CSA 5 can be equal or less than one volume of a control sample (36, CS). Accordingly, the aliquot volume (56) of control sample aliquot CSA 3 and the aliquot volume (56) of control sample aliquot CSA 4 can comprise a dead volume (60, DV) and a volume comprising two control samples (36, CS), each with a volume required for validating a diagnostic test once. The aliquot volume of control sample aliquot CSA 5 can comprise a dead volume (60, DV) and a volume comprising one control sample (36, CS) with a volume required for validating a diagnostic test once. As further shown in FIG. 4B, after each validation time point of a time segment, the aliquot volume (56) of the corresponding transported control sample aliquot (42, CSA) can comprise one control sample (36, CS) less as one control sample (36, CS) can be aspirated by one of the five analyzers (50, 52, 82, 84, 86) for subsequent measuring of the control sample (36, CS).

FIG. 5 depicts another example of a validation time schedule (58). The shown validation time schedule (58) can comprise three validation cycles (65) with a length of one day, validation cycle 1 to validation cycle 3, for a defined time period (63) of three days. The validation time schedule (58) can define for one validation cycle a temporal sequence and a number of validation time points (66) at which a control sample aliquot (42, CSA) can be scheduled to be transported to one or more of the five analyzers A to E (50, 52, 82, 84, 86) for validating the diagnostic test by measuring one control sample (36, CS) of the control sample aliquot (42, CSA). The validation cycle can then be repeated three times during the defined time period (63) of the validation time schedule (58). As shown in FIG. 5A, during the first validation cycle 1 and second validation cycle 2, a first control sample aliquot CSA 1 can be transported to analyzer A (50) at each first validation time point (00:00), to analyzer B (52) at each second validation time point (04:00), to analyzer C (82) at each third validation time point (08:00), to analyzer D (84) at each fourth validation time point (12:00), to analyzer E (86) at each fifth validation time point (16:00) of one validation cycle (65). As the first validation time point (00:00) of the second validation cycle 2 can be eight hours after the fifth validation time point (16:00) of the first validation cycle 1, control sample aliquot CSA 1 can be transported back to the storage (46) before it is transported to analyzer A (50) at the first validation point of validation cycle 2. Thus, for the first validation cycle 1 and second validation cycle 2, the same control sample aliquot CSA 1 can be determined as the control sample aliquot stability time (68) can be two days and, therefore, twice as long as the length of one validation cycle (65). A second control sample aliquot CSA 2 can be stored in the storage (46) during the first two validation cycles as it can be scheduled to be transported to one or more of the five analyzers (50, 52, 82, 84, 86) only for the third validation cycle 3 after the first two validation cycles 1 and 2. In the shown example, the total number of control sample aliquots (42, CSA) can be determined based on the defined time period (63), validation time points per validation cycle (66), and the control sample aliquot stability time (68). The aliquot volume (56) for each control sample aliquot (42, CSA) can be determined based on the number of validation time points (66) per validation cycle (65) and the control sample aliquot stability time (68). Thus, for validating a diagnostic test according to the shown validation time schedule (58), two control sample aliquots (42, CSA), control sample aliquot CSA 1 and control sample aliquot CSA 2, can be required. As for validation cycle 1 and validation cycle 2, ten validation time points (66) can be defined, aliquot volume of control sample aliquot CSA 1 can comprise a dead volume (60, DV) and a volume comprising ten control samples (36, CS), each with a volume required for validating a diagnostic test once (not shown). As for the third validation cycle 3, five validation time points (66) can be defined, the aliquot volume (56) of control sample aliquot CSA 2 can comprise a dead volume (60, DV) and a volume comprising five control samples (36, CS), each with a volume required for validating a diagnostic test once (not shown).

Figure 6B:
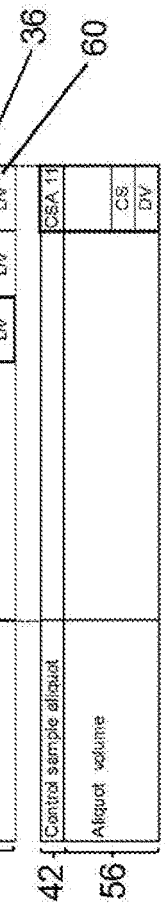

FIGS. 6A and 6B show other examples of validation time schedules (58, 59). In FIG. 6A only the last three time segments (64), time segment 6 to time segment 8, of the validation time schedule (58) are shown. The validation time schedule (58) can be defined for five analyzers A to E (50, 52, 82, 84, 86) and for each of the three shown time segments 6 to 8, a number of validation time points (66) at which a control sample aliquot (42, CSA) can be scheduled to be transported to one or more of the five analyzers A to E (50, 52, 82, 84, 86) for validating the diagnostic test by measuring one control sample (35, CS) of the control sample aliquot (42, CSA). As shown in FIG. 6A, control sample aliquot CSA 8 can be transported at the first validation time point (08:00) of time segment 6 to analyzer C (82) and then back to the storage (46) before it can be further transported to analyzer B (52) at the second validation point of time segment 1. The laboratory system (38) can comprise an addition storage (70), in addition to the storage (46). In this laboratory system setup, the storage (46) can be configured for temporary storage of control sample aliquots (42, CSA), e.g., control sample aliquots (42, CSA) within the storage (46) can be kept at about 4° C. and can therefore be quickly available for validating as no thawing time is required. The additional storage (70) can be configured for long-term storage of control sample aliquots (42, CSA), e.g., control sample aliquots (42, CSA) within the addition storage (70) can be stored at about −20° C. and can therefore be kept longer in the laboratory system (38) than a control sample aliquot onboard stability time. For example, until the end of time segment 6 of the validation schedule (58), control sample aliquot CSA 9 can be stored in the additional storage (70) of the laboratory system (38) and for the first validation time point (00:00) of time segment 7, it can be transported to analyzer A (50). After the control sample aliquot CSA 9 has been transported out of the additional storage (70) for the first time, it can then be transported back to the storage (46) for temporary storage before it can be further transported to analyzer C (82) at the second validation point (08:00) of time segment 7. Thus, for each time segment, a further control sample aliquot (42, CSA) may be retrieved from the additional storage (70) which can then be transported between one or more of the five analyzers A to E (50, 52, 82, 84, 86) and the storage (46) during a time segment. In the lower part of FIG. 6A, control sample aliquots (42, CSA) and aliquot volumes (56) during each time segment (62) of the validation schedule (58) can be indicated.

During operation of an analyzer, it may happen that an unexpected or unscheduled event occurs for which a validation and validation result may be required afterwards. For example, for analyzer D (84), a validation result can be required and a control sample (36, CS) can be required to be transported to analyzer D (84) unexpectedly between the first validation time point (08:00) and second validation time point (16:00) of time segment 6 as indicated by an asterisk in FIG. 6A. Although no validation time point was originally defined for analyzer D (84) between the first validation time point (08:00) and second validation time point (16:00) of time segment 6 in the validation time schedule (58), no immediate intervention by an operator may be required. In order to generate a validation result for analyzer D (84) after the unexpected event occurred, the control unit (54) can define a new validation time point (12:00) between the first validation time point (08:00) and second validation time point (16:00) of time segment 6. Then, as indicated by arrows in FIG. 6A and further described in FIG. 6B, control sample aliquots (42, CSA) or a cascade of control sample aliquots (42, CSA) which can have been transported to one or more of the five analyzers (50, 52, 82, 84, 86) at subsequent validation time points (66) may now be transported to the one or more of the five analyzers (50, 52, 82, 84, 86) at least one validation time point sooner as originally defined in the validation time (58).

FIG. 6B shows an updated version of validation schedule (58) as shown in FIG. 6A after an unexpected or unscheduled event occurred and a new validation time point (12:00) between the first validation time point (08:00) and second validation time point (16:00) of time segment 6 was defined by the control unit (54). Based on the updated version of the validation schedule (58), the control sample aliquot CSA 8 can now be transported to analyzer D (84) at the new defined validation time point (12:00) and not to the storage (46) as originally defined by the validation time schedule (58) as shown in FIG. 6A. Subsequently, the control sample aliquot CSA 8 can be transported to analyzer B (52) at the originally defined second validation time point (16:00) of time segment 6. Then, the further control sample aliquot CSA 9 can be transported from the additional storage (70) to analyzer E (86) at the originally defined third validation time point (20:00) of time segment 6 and afterwards to analyzer A (50) at the first validation time point (00:00) of time segment 7. Finally, the further control sample aliquot CSA 11 can be transported from the additional storage (70) to analyzer C (82) at the second validation time point (08:00) of time segment 7. As control sample aliquot CSA 11 may not be available anymore for the first validation time point (16:00) of time segment 8 of the original validation time schedule (58) as shown in FIG. 6A, the validation time point (16:00) of original time segment 8 can now be defined as first validation time point (16:00) of the first time segment 1 of the next validation time schedule (59). Accordingly, a new or more new vessels (62) containing the total control sample volume (44) for next validation time schedule (59) may have to be provided before the original defined time period (63) of the original validation time schedule (58) ends. Therefore, e.g., at the time when the unexpected or unscheduled event occurs, an alert can be displayed on the user interface (80) of the control unit (54) indicating that a new or more new vessels (62) containing a total control sample volume (44) for the next validation time schedule (59) may have to be provided before the original defined time period (63) ends. Furthermore, information about the new or more new vessels (62) and total control sample volume (44) for the next validation time schedule (59) as well as information about when the new or more new vessels (62) containing a total control sample volume (44) for the next validation time schedule (59) may have to be provided can be displayed on the user interface (80) of the control unit (54). In the example as shown in FIG. 6B., the operator may have to provide the new or more new vessels (62) containing a total control sample volume (44) for the next validation time schedule (59) before the first validation time point (16:00) of the first time segment 1 of the next validation time schedule (59). Thus, the operator can have enough time (24 hours after the unexpected event occurred) to provide the new or more new vessels (62) containing a total control sample volume (44) and may not need to provide one control sample immediately when an unexpected or unscheduled event occurs. As control samples (36, CS) of control sample aliquots (42, CSA) determined for subsequent validation time points can be used for validating a diagnostic test after unexpected events, the risk of test result delays or operation downtime can further be reduced. In the lower part of FIG. 6B, control sample aliquots (CSA, 42) and aliquot volumes (56) during each time segment (62) of the updated version of the validation schedule (58) and the next validation time schedule (59) are shown.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

In the preceding specification, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Reference throughout the preceding specification to "one embodiment", "an embodiment", "one example" or "an example," can mean that a particular feature, structure or characteristic described in connection with the embodiment or example is included in at least one embodiment. Thus, appearances of the phrases "in one embodiment", "in an embodiment", "one example" or "an example," in various places throughout this specification are not necessarily all referring to the same embodiment or example.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure. Furthermore, the particular features, structures, or characteristics may be combined in any suitable combinations and/or sub-combinations in one or more embodiments or examples.

We claim:

1. A method to provide control samples for validating a diagnostic test within a laboratory system, wherein the laboratory system comprises an aliquoting device configured to generate control sample aliquots from a total control sample volume, a storage configured to store control sample aliquots, a transport system configured to transport control sample aliquots, at least two analyzers configured to execute the diagnostic test and to validate the diagnostic test by measuring one control sample, and a control unit, wherein the aliquoting device, the storage, and the at least two analyzers are operatively connected to the transport system, and wherein the aliquoting device, the storage, the transport system, and the at least two analyzers are communicatively connected to the control unit, wherein the laboratory system further comprises a disposal unit for disposing of the generated control sample aliquots which is operatively connected to the transport system, wherein the storage, the at least two analyzers, and the transport system have defined temperatures, the method comprising:

a) determining, by the control unit, a total number of control sample aliquots and an aliquot volume for each control sample aliquot based on a validation time schedule, wherein each aliquot volume comprises a dead volume and a volume comprising a determined number of control samples, each with a volume required for validating the diagnostic test once;

b) providing one or more vessels containing the total control sample volume to the aliquoting device, wherein the total control sample volume is at least the sum of aliquot volumes of the total number of control sample aliquots;

c) generating, by the aliquoting device, the determined total number of control sample aliquots with the determined aliquot volume for each control sample aliquot, wherein each generated control sample aliquot comprises a unique control sample aliquot identity associated with at least a control sample aliquot onboard stability time, wherein the storage and the at least two analyzers each comprise a reader configured to read the unique control sample aliquot identity;
d) controlling, by the control unit, the transport system to transport each generated control sample aliquot to the storage or to one or more of the at least two analyzers for validating the diagnostic test by measuring one control sample of each generated control sample aliquot according to the validation time schedule;
e) reading, by a selected reader of the plurality of readers, the unique control sample aliquot identity each time a generated control sample aliquot arrives at or leaves the storage or one or more of the at least two analyzers;
f) creating, by the selected reader of the plurality of readers, a time stamp when reading the unique control sample aliquot identity;
g) calculating, by the control unit, a first time duration at which the generated control sample aliquot was kept at one or more of the defined temperatures, or a second time duration during which the generated control sample aliquot was transported a number of times to the one or more of the at least two analyzers based on the created time stamps;
h) comparing, by the control unit, the calculated first or second time durations with the control sample aliquot onboard stability time; and
i) controlling, by the control unit, the transport system to transport the generated control sample aliquot to the disposal unit if the calculated first or second time durations exceed the control sample aliquot onboard stability time.

2. The method according to claim 1, wherein the validation time schedule comprises a defined time period and at least one time segment, wherein the validation time schedule defines for each of the at least two analyzers and for each of the at least one time segment a number of validation time points at which the generated control sample aliquot is scheduled to be transported to one or more of the at least two analyzers for validating the diagnostic test by measuring one control sample of the generated control sample aliquot.

3. The method according to claim 2, wherein the time segment is a control sample aliquot onboard stability time or a fraction of the control sample onboard stability time.

4. The method according to claim 2, wherein in step a), the total number of control sample aliquots is determined based on the number of the at least one time segment and a number of control sample aliquots per time segment, wherein the aliquot volume of a control sample aliquot of one of the at least one time segment is determined based on the number of validation time points of the one of the at least one time segment.

5. The method according to claim 4, wherein the number of control sample aliquots per time segment is determined by a maximum number of the at least two analyzers for which at least one same validation time point is defined per time segment, wherein the aliquot volume of a control sample aliquot of one of the at least one time segment is determined by the maximum number of the at least two analyzers for which at least one same validation time point is defined for the one of the at least one time segment.

6. The method according to claim 5, wherein the determined number of control samples required for the number of validation time points of one of the at least one time segment is distributed to the determined number of control sample aliquots of the one of the at least one time segment so that the aliquot volume difference of each determined control sample aliquot of the one of the at least one time segment is equal or less than one volume of a control sample.

7. The method according to claim 1, further comprising
j) controlling, by the control unit, the transport system to transport each generated control sample aliquot between the storage and the at least two analyzers for validating the diagnostic test by measuring one control sample of each generated control sample aliquot according to the validation time schedule.

8. The method according to claim 1, wherein the laboratory system comprises an additional storage, wherein the additional storage is operatively connected to the transport system and communicatively connected to the control unit, wherein the storage is configured for temporary storage of control sample aliquots and the additional storage is configured for long-term-storage of control sample aliquots, wherein step d) further comprises controlling, by the control unit, the transport system to transport each generated control sample aliquot to the storage for temporary storage or to one or more of the at least two analyzers for validating the diagnostic test by measuring one control sample of each generated control sample aliquot, or to the additional storage for long-term storage according to the validation time schedule and to transport each generated control sample aliquot to the additional storage for long-term storage before each generated control sample aliquot is transported to the storage for temporary storage or to one or more of the at least two analyzers for validating the diagnostic test by measuring one control sample of each generated control sample aliquot according to the validation time schedule.

9. The method according to claim 8, further comprising,
k) controlling, by the control unit, the transport system to transport each generated control sample aliquot from the additional storage to the storage for temporary storage or to one or more of the at least two analyzers for validating the diagnostic test by measuring one control sample of each generated control sample aliquot according to the validation time schedule; and
l) controlling, by the control unit, the transport system to transport each generated control sample aliquot between the storage for temporary storage and one or more of the at least two analyzers for validating the diagnostic test by measuring one control sample of each generated control sample aliquot according to the validation time schedule.

* * * * *